United States Patent [19]

Shirasu et al.

[11] 4,368,383
[45] Jan. 11, 1983

[54] SYSTEM FOR FOCUS DETECTION UTILIZING A PHOTOELECTRIC SENSOR ARRAY

[75] Inventors: Hiroshi Shirasu, Kawasaki; Akira Ogasawara; Ken Utagawa, both of Yokohama, all of Japan

[73] Assignee: Nippon Kogaku K.K., Tokyo, Japan

[21] Appl. No.: 294,724

[22] Filed: Aug. 20, 1981

Related U.S. Application Data

[63] Continuation of Ser. No. 97,868, Nov. 27, 1979.

[30] Foreign Application Priority Data

Nov. 30, 1978 [JP] Japan .................. 53-147227
Dec. 25, 1978 [JP] Japan .................. 53-158693

[51] Int. Cl.³ .................... G01J 1/16; G03B 3/00
[52] U.S. Cl. .................... 250/201; 250/204; 354/25
[58] Field of Search .......... 250/201, 204, 214 P, 250/578; 354/25; 356/141, 152

[56] References Cited

U.S. PATENT DOCUMENTS 4,047,187  9/1977  Mashimo et al. ............ 250/201 X
4,173,402  11/1979 Horike et al. ............... 250/204 X
4,184,968  1/1980  Stauffer ........................ 250/201

Primary Examiner—David C. Nelms
Assistant Examiner—Edward P. Westin
Attorney, Agent, or Firm—Fitzpatrick, Cella, Harper & Scinto

[57] ABSTRACT

A light measuring device capable of amplifying the difference of the time-sequential pulse output signals from the photoelectric sensor array regardless of the magnitude of said pulse output signals, comprises optical system means; means comprising a photoelectric sensor array having a plurality of photoelectric sensors for receiving the light passing through said optical system means and generating electric signals respectively corresponding to the intensity of light received by said photoelectric sensors as time-sequential signals of a determined interval; means for generating a comparison signal of a determined magnitude related to the output level of said electric signals; and processing means adapted to receive said electric signals and said comparison signal to generate output signals related to the difference of said signals in a sequential manner.

13 Claims, 9 Drawing Figures

SYSTEM FOR FOCUS DETECTION UTILIZING A PHOTOELECTRIC SENSOR ARRAY

This is a continuation of application Ser. No. 097,868, filed Nov. 27, 1979.

BACKGROUND OF THE INVENTION

The present invention relates to a light measuring device for measuring the intensity distribution of light, and more particularly to a light measuring device for use in a focus detecting apparatus for example for a camera.

In the focus detecting apparatus for a camera it is already known to form a light image of an object on a photoelectric sensor array and to detect the focusing of said object by the photoelectric output of said array representing the intensity distribution of said light image. The photoelectric output from said photoelectric sensor array, consisting of time-sequential pulses corresponding to the light intensities on the photoelectric sensors, often becomes unable to provide the difference information because of the saturation of the signal amplifier in case the object has a high average luminance giving rise to a high illumination intensity of the light image. On the other hand the information required for the focus detection is the distribution of the light intensity, i.e. the difference of the output signals from the photoelectric sensors. Consequently it is desirable, in the amplification of the time-sequential pulse output from the photoelectric sensor array, to amplify only the difference with respect to a reference voltage selected suitably according to the DC level of said output.

SUMMARY OF THE INVENTION

The object of the present invention is to provide a light measuring device capable of amplifying the difference of the time-sequential pulse output signals from the photoelectric sensor array regardless of the magnitude of said pulse output signals.

According to the present invention, the above-mentioned object is achieved by a light measuring device comprising optical system means; means comprising a photoelectric sensor array having a plurality of photoelectric sensors for receiving the light passing through said optical system means and generating electric signals respectively corresponding to the intensity of light received by said photoelectric sensors as time-sequential signals of a determined interval; means for generating a comparison signal of a determined magnitude related to the output level of said electric signals; and processing means adapted to receive said electric signals and said comparison signal to generate output signals related to the difference of said signals in a sequential manner.

Now the present invention will be clarified in detail by the following description of the embodiments thereof to be taken in conjunction with the attached drawings.

BRIEF DESCRIPTION OF THE DRAWINGS

FIGS. 2A to 2C are charts showing the gate pulses to be employed in the circuit shown in FIG. 1;

DETAILED DESCRIPTION OF THE PREFERRED EMBODIMENTS

Figure 1:
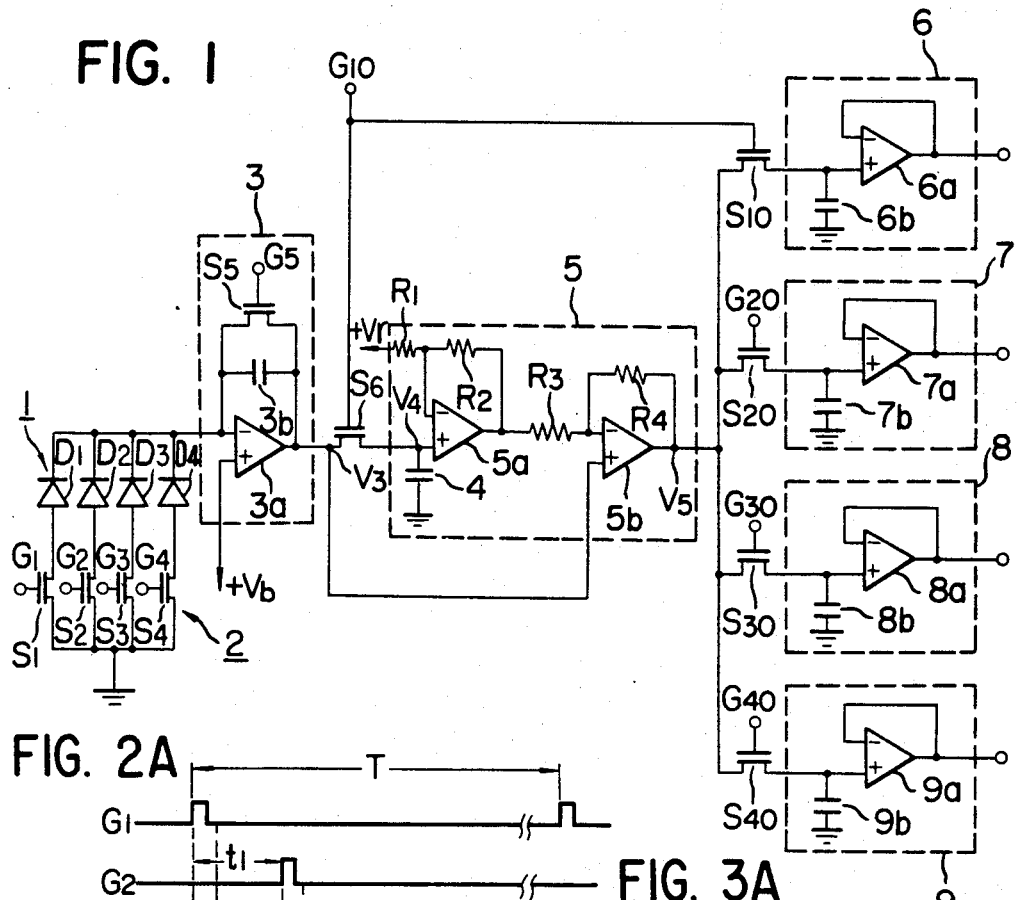
FIG. 1 is a circuit diagram of a first embodiment of the light measuring device of the present invention.

FIG. 1 shows a first embodiment of the light measuring device of the present invention, wherein a photodiode array 1 consisting of four photodiodes D1-D4 and a switching element array 2 consisting of field-effect transistors S1-S4 are connected to a sample hold circuit 3 provided with an operational amplifier 3a, a feedback condenser 3b and a reset switch S5, and the output of said sample hold circuit 3 is connected through a field-effect transistor S6 to a processing circuit 5 consisting of a condenser 4 and operational amplifiers 5a and 5b. Further the output of said processing circuit 5 is connected through field-effect transistors S10-S40 to hold circuits 6-9 having operational amplifiers 6a-9a.

Figure 2A:
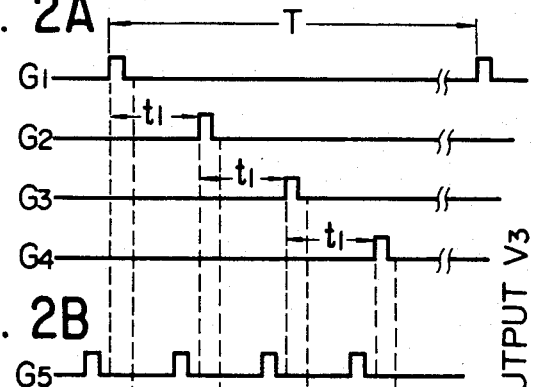

The field-effect transistors S1-S4 are rendered momentarily conductive upon receipt at the gates G1-G4 thereof of drive pulses delayed in succession by a time t1 within a cycle period T as shown in FIG. 2A.

Figure 3A:
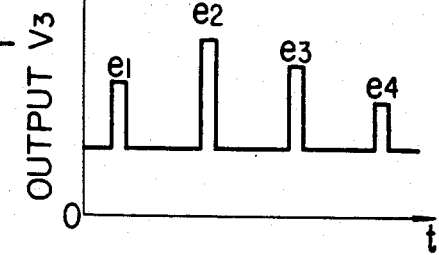
FIGS. 3A and 3B are charts showing the examples of the processed signal voltages.

During such conductive state of the transistors S1-S4 the charges accumulated at the p-n junctions of the photodiodes D1-D4 in response to the light received during the non-conductive state of said transistors S1-S4 are transferred in succession to the sample hold circuit 3. The reset switch S5 is rendered conductive by gate pulses G5 as shown in FIG. 2B immediately before the conductive states of said field-effect transistors S1-S4 to dissipate the charge previously transferred from the photodiode and to prepare for the charge transfer from the succeeding photodiode. Consequently, in response to the successive conduction of the field-effect transistors S1-S4 with a delay time t1, the sample hold circuit 3 generates the output voltages e1-e4 as shown in FIG. 3A corresponding to the intensity of the light received by the photodiodes D1-D4.

When the field-effect transistor S6 is in non-conductive state, the output voltage V5 of the processing circuit 5 is given by the following equation:

$$V_5 = N_1 \cdot N_2 \cdot V_r - (1+N_1) \cdot N_2 \cdot V_4 + (1+N_2)V_3 \quad (1)$$

wherein $N_1 = R_2/R_1$, $N_2 = R_4/R_3$, $V_r$ is the reference voltage, $V_3$ is the output voltage of the circuit 3, and $V_4$ is the voltage accumulated in the condenser 4.

When the resistors R1-R4 are so selected as to satisfy the relation:

$$N_1 \cdot N_2 = R_2 \cdot R_4 / R_1 \cdot R_3 = 1$$

then the equation (1) becomes:

$$V_5 = V_r + (1+N_2)(V_3 - V_4) \quad (2)$$

When the field-effect transistor S1 is rendered conductive, the output voltage V3 of the circuit 3 becomes equal to $e_1$ as explained in the foregoing.

Figure 2C:
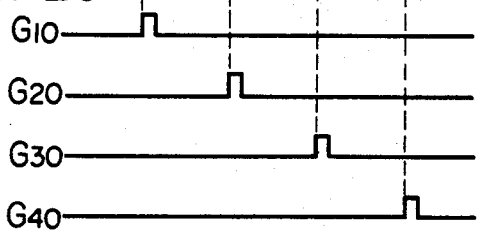

Then, when the field-effect transistors S6 and S10 are rendered conductive at the timing shown in FIG. 2C, then $V_3 = V_4 = e_1$ so that the equation (2) gives $V_5 = V_r$, which is memorized through the transistor S10 in the condenser 6b of the hold circuit 6.

After the circuit 3 is reset by the closing of the reset switch S5, the field-effect transistor S2 is rendered conductive so that $V_3$ becomes equal to $e_2$.

Subsequently the field-effect transistor S20 is rendered conductive but the transistor S6 remain non-conductive so that $V_4=e_1$, and from the equation (2) there is obtained $V_5=V_r+(1+N_2)(e_2-e_1)$ of which value is memorized in the condenser $7b$ of the hold circuit 7.

Also upon subsequent conduction of the field-effect transistor S3 there is obtained $V_3=e_3$ while $V_4=e_1$ because of the non-conductive state of the transistor S6, so that from the equation (2) there is obtained $V_5=V_r+(1+N_2)(e_3-e_1)$ which is memorized, through the field-effect transistor S30, in the hold circuit 8.

Similarly in response to the conduction of the field-effect transistors S4 and S40 a value $V_5=V_r+(1+N_2)(e_4-e_1)$ is memorized in the hold circuit 9.

Figure 3B:
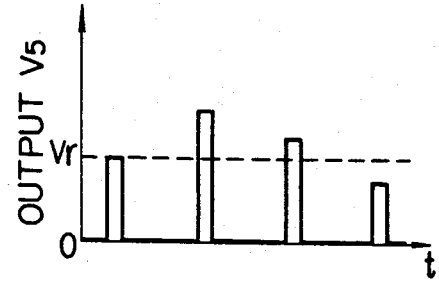

Thus, as shown in FIG. 3B, the hold circuit 6 memorizes the input voltage $V_r$ to the operational amplifier $5a$ regardless of the value $e_1$ while the hold circuit 7 memorizes the difference between $e_2$ and $e_1$ appropriately amplified and added with the value $V_r$, and hold circuits 8 and 9 similarly memorize the difference between $e_3$ and $e_4$ and $e_1$ appropriately amplified and added with the value $V_r$.

In this manner it is rendered possible to amplify the voltage differences $(e_2-e_1)$, $(e_3-e_1)$ and $(e_4-e_1)$ representing the light intensity difference between the photodiodes D1-D4 and also to maintain the output voltage V5 within the dynamic range of the amplifiers $5a$, $5b$ by selecting the voltage $V_r$ at the center of the dynamic ranges thereof.

Although in the foregoing embodiment the photoelectric output signals after amplification are stored in hold circuits 6-9 for parallel processing afterwards, such storage is naturally unnecessary in case such output signals are directly process in time-sequential manner.

Figure 4:
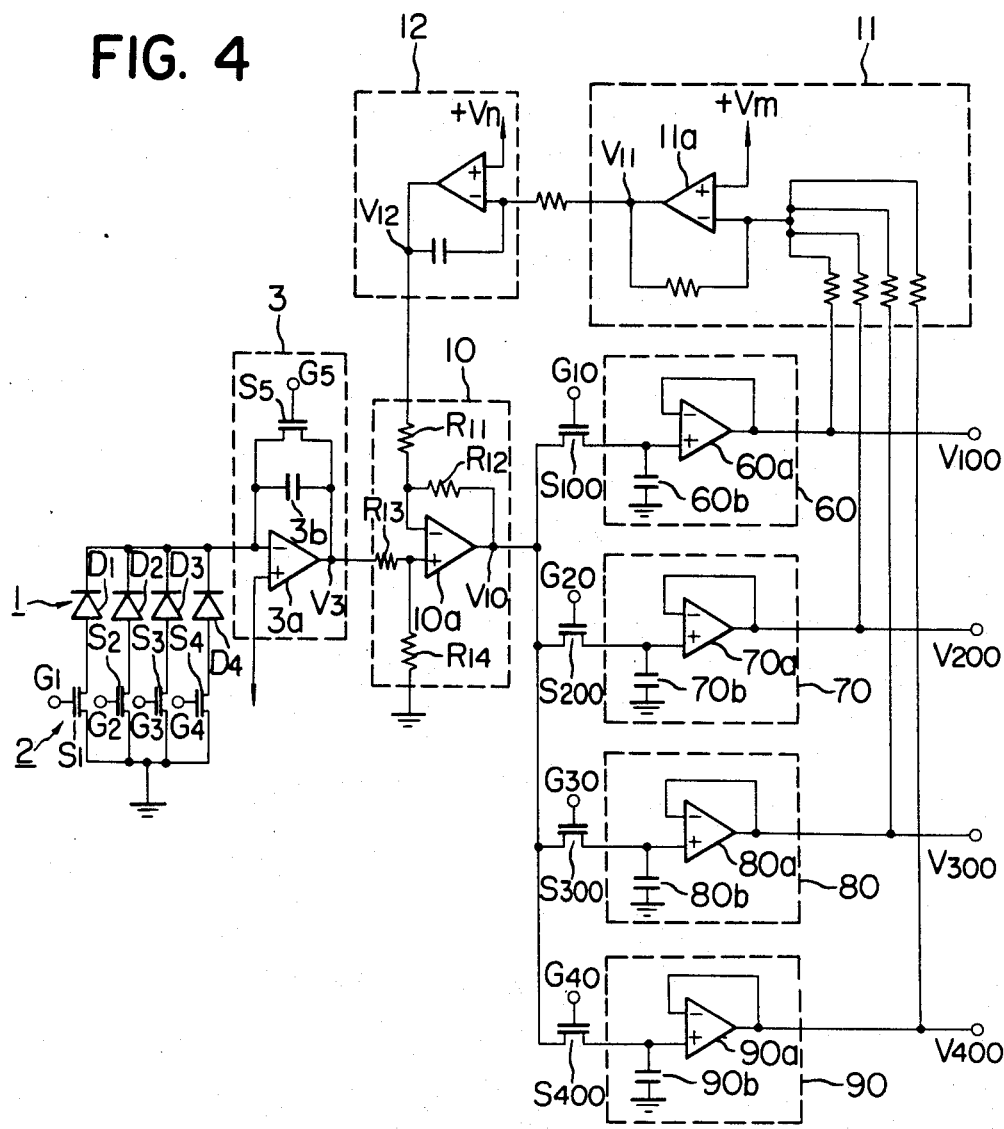
FIG. 4 is a circuit diagram of a second embodiment of the light measuring device of the present invention.

FIG. 4 shows a second embodiment of the present invention, wherein the sample hold circuit 3 connected to the photodiode array 1 and the switching element array 2 generates, in a similar manner as in the first embodiment shown in FIG. 1, output voltages e1-e4 corresponding to the intensity of light received by the photodiodes D1-D4.

The uninverted input terminal of a differential amplifier 10 composed of an operational amplifier $10a$ and resistors R11-R14 receives the output voltage V3 from the sample hold circuit 3 while the inverted input terminal of said differential amplifier receives the feedback voltage V12 to generate an output signal V10 related to the difference between said inputs V3 and V12. Assuming that $R12/R11 = R13/R14$, the output signal V10 can be represented by:

$$V_{10} = -R_{12} \cdot (V_3 - V_{12})/R_{11}$$

Thus the voltage V10 assumes the values $e_1'-e_4'$ respectively corresponding to the photoelectric output voltages e1-e4 each subtracted by a constant comparison voltage V12. The output signals V10 are stored in the hold circuits 60-90 respectively provided with memory condensers $60b-90b$ through field-effect transistors S100-S400. Said transistors are rendered conductive, in a similar manner as in the foregoing first embodiment, by gate pulses G10-G40 shown in FIG. 2C respectively generated immediately after the gate pulses G1-G4, so that said memory condensers $60b-90b$ respectively store the voltages $e_1'-e_4'$ respectively equal to the photoelectric output voltages e1-e4 each subtracted by the comparison voltage V12, said stored voltages being taken out as the output voltages V100-V400 for focus detection.

On the other hand the memorized output voltages $e_1'-e_4'$ are averaged in an averaging circuit 11 and compared with a standard voltage $V_m$. If the resistances connected to the hold circuits are selected mutually equal and equal to four times of the feedback resistance of the operational amplifier $11a$, the output voltage V11 of said averaging circuit is represented by:

$$V_{11} = 2V_m - \bar{e}'$$

wherein $\bar{e}' = (e_1' + e_2' + e_3' + e_4')/4$. The above-mentioned output voltage V11 is supplied to an integrating circuit 12 which integrates said voltage as a value compared with the reference voltage $V_n$. Thus the integrating circuit 12 provides an output V12:

$$V_{12} = a + b \int (V_n - 2V_m + \bar{e}')dt$$

The above-mentioned output V12 is supplied as the comparison feedback voltage to the inverted input terminal of the aforementioned differential amplifier 10. In this manner the output V12 is the time-integrated difference between a constant reference voltage $V_r$ and the averaged value $\bar{e}'$ of the memorized difference signals.

In case a light image of a given light intensity is formed on the photoelectric sensor array 1 to provide a determined photoelectric output, the above-explained feedback system is in equilibrium when the output of the integrating circuit 12 is maintained constant in time. Said output voltage V12 becomes constant in time when the input voltage to the integrating circuit 12 is zero, i.d.:

$$V_n - 2V_m + \bar{e}' = 0$$

In the present embodiment, therefore, the average value $e'$ of the voltages $e_1'-e_4'$ stored in the memory condensers $60b-90b$ is selected equal to the determined reference voltage $V_r - V_n - 2V_m$. In this manner it is rendered possible to obtain the output signals V100-V400 containing the information of the intensity distribution but having a constant average level regardless of the DC level of the photoelectric output signals, thus avoiding the saturation of the amplifier.

Figure 5A:
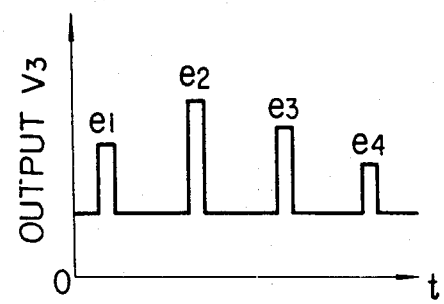
FIGS. 5A and 5B are charts showing the examples of the processed signal voltages.
Figure 5B:
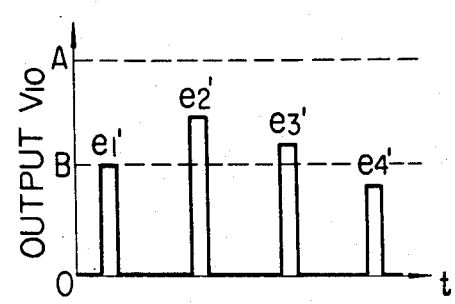

Now the function of the present embodiment will be explained while making reference to FIGS. 5A and 5B in which FIG. 5A shows the photoelectric output signals e1-e4 from the photoelectric sensor array while FIG. 5B shows the difference output signals $e_1'-e_4'$ obtained by subtraction of the reference voltage V12 from said signals e1-e4 and amplification by a determined gain in the differential amplifier 10 and stored in the condensers $60b-90b$. As the feedback system is controlled in such a manner that the average value $\bar{e}'$ of said difference signals $e_1'-e_4'$ becomes equal to the determined reference voltage $V_r$, the difference signals $e_1'-e_4'$ become distributed around the reference voltage $V_r$ as shown in FIG. 5B regardless of the DC level of the original photoelectric signals e1-e4. Thus it is rendered possible to most advantageously amplify the information on the intensity distribution contained in the photoelectric output signals e1-e4 by selecting the reference voltage $V_r$ at the center of the dynamic range of the differential amplifier 10.

What we claim is:

1. In a light measuring device comprising photoelectric conversion means including a plurality of photoelectric conversion elements arranged in an optical path for converting light received thereon to respective electric signals of magnitudes corresponding to the light intensity, the photoelectric conversion means time-sequentially putting out the electric signals at a predetermined time interval; means for detecting the distribution of light on the photoelectric conversion elements, the improvement comprising:
    amplifying means electrically connected between the photoelectric conversion means and the detecting means, the amplifying means including means for generating a comparison signal of a predetermined magnitude related to the output level of one of said electric signals, processing means for generating output signals related to the difference between the comparison signal and each of the other of said electric signals, and an amplifier for amplifying the output signals.

2. In a light metering device comprising photoelectric conversion means including a plurality of photoelectric conversion elements disposed in the image forming position of an image forming optical system for converting light received on the elements to respective electric signals of magnitudes corresponding to the light intensity, the photoelectric conversion means time-sequentially putting out said electric signals at a predetermined time interval; and means for detecting the state of the image formed through the image forming optical system, the improvement comprising:
    amplifying means electrically connected between the photoelectric conversion means and the detecting means, the amplifying means including means for generating a comparison signal of a predetermined magnitude related to the output level of one of said electric signals, processing means for generating output signals related to the difference between the comparison signal and each of the other of said electric signals, and an amplifier for amplifying the output signals.

3. A light measuring device according to claims 1 or 2, wherein said comparison signal generating means is connected to said photoelectric conversion means and include first memory means for storing the first of said time-sequential electric signals.

4. A light measuring device according to claim 3, wherein said processing means comprise:
    means for generating a reference signal $V_r$ of a determined voltage level; and
    a processing circuit 5 for generating, as said output signals, the sum of said reference signal and of the difference between said electric signals and comparison signal.

5. A light measuring device according to the claims 1 or 2, further comprising memory means connected to said amplifying means for storing said output signals in respectively determined positions.

6. A light measuring device according to claims 1 or 2, further comprising means (11, 60-90) for generating an average output signal representing the arithmetic average of a series of output signals generated by said amplifying means respectively corresponding to said photoelectric conversion elements, and said comparison signal generating means comprising feedback means (12) for supplying said average output signal to said processing means as said comparison signal.

7. A light measuring device according to claim 6, wherein said average output signal generating means comprise:
    memory means (60-90) connected to said amplifying means for storing said series of output signals respectively in determined positions; and
    an averaging circuit 11 for obtaining arithmetic average of said output signals stored in said memory means.

8. A light measuring device according to claim 7, wherein said memory means comprise a plurality of hold circuits (60-90) for temporarily storing said output signals respectively corresponding to said plurality of photoelectric conversion elements.

9. A light measuring device according to claim 7, wherein said feedback means comprise:
    means for generating a reference signal of a constant voltage level; and
    an integrating circuit for integrating the difference of said reference signal and said average output signal and supplying the thus integrated signal as said comparison signal.

10. A light measuring device according to claim 9, wherein the voltage level of said reference signal of said feedback is selected at the approximate center of the dynamic range of said amplifier.

11. In a light measuring device comprising photoelectric conversion means including a plurality of photoelectric conversion elements arranged in an optical path for converting light received thereon to respective electric signals of magnitudes corresponding to the light intensity, the photoelectric conversion means time-sequentially putting out the electric signals at a predetermined time interval; means for detecting the distribution of light on the photoelectric conversion elements, the improvement comprising:
    amplifying means electrically connected between the photoelectric conversion means and the detecting means, the amplifying means including means for generating a comparison signal of a predetermined magnitude related to the output level of a series of said electric signals, processing means for generating output signals related to the difference between the comparison signal and each of said electric signals, and an amplifier for amplifying the output signals.

12. In a light metering device comprising photoelectric conversion means including a plurality of photoelectric conversion elements disposed in the image forming position of an image forming optical system for converting light received on the elements to respective electric signals of magnitudes corresponding to the light intensity, the photoelectric conversion means time-sequentially putting out said electric signals at a predetermined time interval; and means for detecting the state of the image formed through the image forming optical system, the improvement comprising:
    amplifying means electrically connected between the photoelectric conversion means and the detecting means, the amplifying means including means for generating a comparison signal of a predetermined magnitude related to the output level of a series of said electric signals, processing means for generating output signals related to the difference between the comparison signal and each of said electric signals, and an amplifier for amplifying the output signals.

13. A light measuring device according to claims 11 or 12, wherein said comparison signal generating means comprises means for generating an average output signal related to the arithmetic average of a series of said electric signals and means for supplying said average output signal to said processing means as said comparison signal.

* * * * *

UNITED STATES PATENT AND TRADEMARK OFFICE
CERTIFICATE OF CORRECTION

PATENT NO. : 4,368,383
DATED : January 11, 1983
INVENTOR(S) : HIROSHI SHIRASU, ET AL.

It is certified that error appears in the above-identified patent and that said Letters Patent is hereby corrected as shown below:

Column 4, line 43, "e'" should be --$\bar{e}'$-- ;

lines 62-63, change "$e_1 - e_4$" to --$e_1' - e_4'$--.

Signed and Sealed this

Fifth Day of April 1983

[SEAL]

Attest:

GERALD J. MOSSINGHOFF

Attesting Officer     Commissioner of Patents and Trademarks